Sept. 19, 1961         W. H. HAWKINS         3,000,652
                   VEHICLE TOWING EQUIPMENT
Filed Nov. 6, 1957                      2 Sheets-Sheet 1
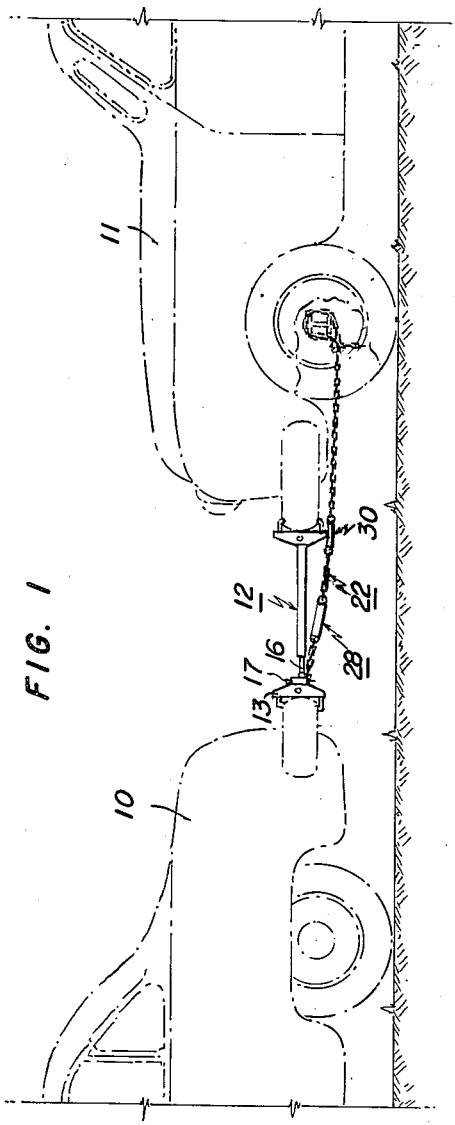
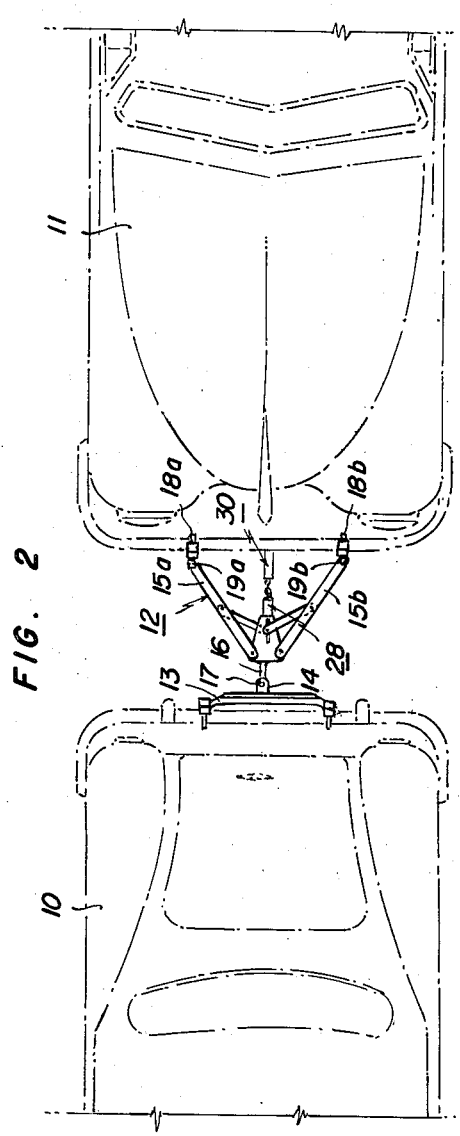
INVENTOR
WALLACE H. HAWKINS
BY
ATTORNEY Sept. 19, 1961  W. H. HAWKINS  3,000,652
VEHICLE TOWING EQUIPMENT
Filed Nov. 6, 1957  2 Sheets-Sheet 2
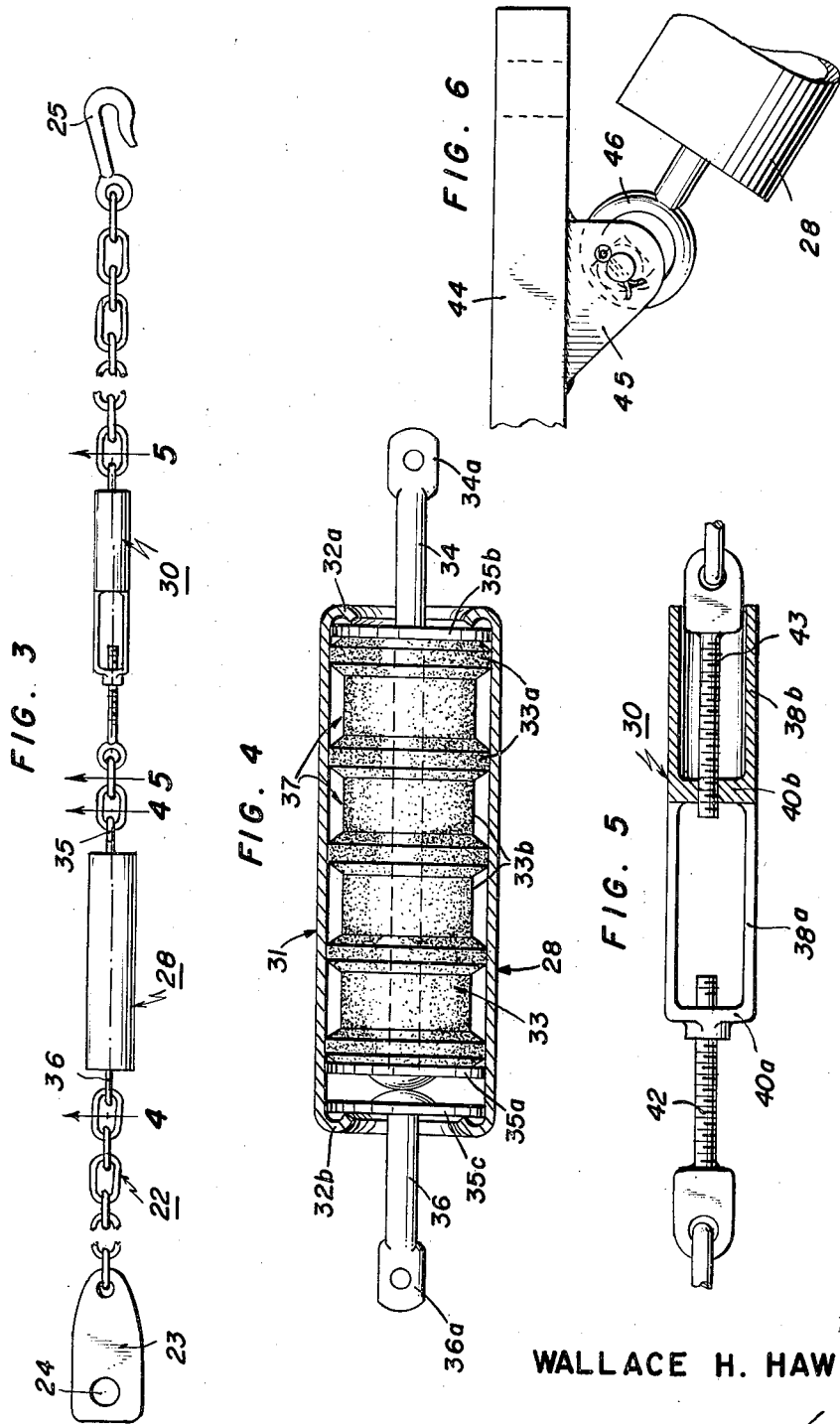
INVENTOR
WALLACE H. HAWKINS
BY *J. Harold Kilcoyne*
ATTORNEY United States Patent Office 3,000,652
Patented Sept. 19, 1961

3,000,652
VEHICLE TOWING EQUIPMENT
Wallace H. Hawkins, P.O. Box 677, Panama City, Fla.
Filed Nov. 6, 1957, Ser. No. 694,781
7 Claims. (Cl. 280—406)

This invention relates to improvements in towing equipment of the type disclosed in my application Serial No. 654,808, filed April 24, 1957 (now abandoned), of which the present application is a continuation-in-part, and is more particularly directed to an automatic tow bar stabilizer for use in combination with a conventional towbar assembly for towing automotive vehicles over the road and serving numerous beneficial purposes, principally to hold down the rear end of the towing vehicle upon sudden application of the brakes thereof, thereby preventing the occurrence of the condition known as "jack-knifing" and "submarining" of the towed vehicle with respect to the towing vehicle, to maintain sufficient towing vehicle traction as enables said towing vehicle to keep control of the towed vehicle under all driving conditions likely to be encountered, to improve the steering properties of the vehicle train, and to save wear on the tires of the towing vehicle.

In explanation, it is well known that when the brakes of an automotive vehicle are quickly applied, the rear end of the vehicle tends to be thrown or lifted suddenly upwardly, with some loss of rear-wheel traction which in regular vehicle use is not a matter of serious concern. However, when the vehicle is used as a towing vehicle, this tendency of its rear end to lift upon sudden application of the brakes may initiate the dangerous condition known as "jack-knifing" or "submarining", which is usually brought about by the forward momentum of the towed vehicle being transmitted by the rigid tow bar to the towing vehicle in the form of a substantial rear-end lifting force. When these rear-end lifting forces are combined, the rear end of the towing vehicle may be lifted to an extent that rear-wheel traction and hence rear-wheel braking effect is completely lost, with corresponding greater likelihood of collision due to the insufficient braking effect provided by the front wheels only of the towing vehicle. While numerous expedients seeking to correct this undesirable condition have been advanced from time to time, such have not been acceptable to tow bar users for various and sundry reasons, with the result that the danger of accidents and collisions caused by loss of braking control being provided by the towing vehicle of a vehicle tow train has persisted in large measure.

Broadly stated, an object of the present invention is the provision of simple, readily attachable auxiliary equipment for use with standard vehicle towing means, and serving to prevent jack-knifing or submarining of the towed vehicle with respect to the towing vehicle upon sudden application of the brakes of the latter.

More particularly, the invention contemplates and provides an automatic tow bar stabilizer for use with standard tow bar assemblies, which is so constructed and arranged as effectively to supply a hold-down force to the rear end of the towing vehicle of a tow train which opposes the tendency of said rear end to buck or lift when the brakes of said towing vehicle are suddenly applied, as may initiate the undesirable condition of the towed vehicle jack-knifing or submarining with the towing vehicle.

A further object of the invention is the provision of a tow bar stabilizer as aforesaid which is also effective under normal towing conditions to transfer sufficient of the weight of the towed vehicle to the rear wheels of the towing vehicle as maintains and even increases towing vehicle traction and moreover keeps said towing vehicle in complete control over the towed vehicle and at the same time renders said towed vehicle easier to steer.

Still another object of the invention is the provision of a tow bar stabilizer which, by virtue of its ability to maintain the rear wheels of the towing vehicle in traction with the roadway under all of the many varying driving conditions, saves appreciable wear on the tire of the towing vehicle wheels heretofore caused by lack of weight on and hence lack of traction of the rear wheels of the towing vehicle and which resulted in said wheels slipping and skidding on turns, spinning on take-offs, etc.

A still further object of the invention is the provision of a tow bar stabilizer which, when used with a standard tow bar type hitch between towing and towed vehicle as intended, serves to bind the towed vehicle to the towing vehicle with resilient force sufficient to take up any slack in the tow bar-to-vehicle connections and thereby overcomes "snatching" of the bumpers by the tow bar clamps, and which also serves as a supplemental draft connection between vehicles as prevents their bumpers from being pulled loose by the tow bar acting as the sole draft connection between said vehicles.

Yet another object of the invention is the provision of an automatic tow bar stabilizer for use with a standard tow bar hitch providing draft from a towing to a towed vehicle, which takes the form of a heavy-duty chain of length somewhat greater than the spacing between said vehicles when the latter are set up for towing, and which is provided with an attaching eye at its forward end adapted to receive the pin or connecting bolt which customarily provides the connection between the tow bar tongue and tow bar proper, whereby the chain front-end may be attached to the towing vehicle by said pin or bolt, and with a hook at its rearward end providing a simple means of securely anchoring said rear end to the front frame or axle of the towed vehicle, and which further incorporates a specially constructed shock unit and a turnbuckle means for adjusting the tension of said chain following its attachment as aforesaid.

The above and other objects and advantages of an automatic tow bar stabilizer according to the present invention will appear from the following detailed description thereof, in which reference is had to the accompanying illustrative drawings, wherein—

FIG. 1 is a side elevation of vehicle tow means incorporating the automatic tow bar stabilizer of the invention;

FIG. 2 is a plan view of the towing means illustrated in FIG. 1;

FIG. 3 is an enlarged but foreshortened view of the automatic tow bar stabilizer of the invention, disassociated from the tow bar assembly with which it is combined in use;

FIG. 4 is a section taken along line 4—4 of FIG. 3, illustrating the details of the special shock unit;

FIG. 5 is a section taken along line 5—5 of FIG. 3, which similarly illustrates the details of the turnbuckle means employed to adjust the tension of the stabilizer; and FIG. 6 is a detail view illustrating a modified form of stabilizer-to-tow-bar assembly connecting means.

Referring to the drawings in detail, reference numeral 10 (FIGS. 1 and 2) designates a towing vehicle in the form of a conventional passenger automobile, and reference character 11 designates a towed vehicle, similarly shown to be a passenger automobile. The towing or draft connection between said vehicles comprises a standard tow bar assembly generally indicated at 12 which is attached at its forward end, as by a draw beam 13 carrying bumper-attaching clamps at its ends and having a central rearwardly extending tongue 14, to the rear bumper of the towing vehicle and at its rearward end, via divergent arms 15a, 15b connected to a central draft bar 16 pivotally connected to the tow bar tongue 14, to the front bumper of the towed vehicle. Illustratively, the connection between the tow bar tongue 14 and the tow bar 16 is by means of a vertically disposed pivot pin 17, the pivotal connection afforded by said pin enabling the towed vehicle 11 to "track" the towing vehicle 10. It will also be understood that the rear ends of the divergent draft arms 15a, 15b are connected to the brackets 18a, 18b which secure the tow bar assembly to the front bumper of the towed vehicle as by ball and socket joints 19a, 19b, whereby the towed vehicle may adjust vertically with respect to the towing vehicle within the usual limits permitted by standard towing practice. The aforesaid towing connection is of course well known in the art and hence constitutes no part of the present invention, except as it may enter into combination with an automatic tow bar stabilizer of the invention to be described.

As explained above, if the brakes of the towing vehicle 10 are applied suddenly, the rear end of said vehicle tends to be thrown upwardly-forwardly with respect to the ground or pavement. Since it is not usually feasible to brake the towed vehicle with the towing vehicle, the momentum of the towed vehicle is momentarily unchecked and is of course transmitted through the longitudinally rigid tow bar assembly 12 to the lifting or already lifted rear end of the towing car as a force tending to further lift same. When such occurs, the towed vehicle tends to forcibly drive in under the rear end of the towing vehicle and may actually lift said rear end to an extent that traction of its rear wheels is lost completely, with the resulting danger of collision or accident due to inadequate braking control of the interconnected vehicle train.

To safeguard against occurrence of such a condition, the present invention provides a tow bar stabilizer acting automatically to apply a readily adjustable, spring holddown force on the tow bar draft beam 13 and thereby on the rear end of the towing vehicle both normally, but more especially in the event the latter tends to raise or lift when its brakes are applied suddenly, which force not only acts in opposition but also proportionally to the rear-end lifting force, that is to say, it increases with said lifting force. As best seen in FIG. 3, such a tow bar stabilizer comprises an elongated heavy-duty chain 22 of length substantially greater than the longitudinal dimension of the tow bar assembly. At its forward end said chain is provided with a flat or plate-form attaching link 23 having a hole 24 of diameter enabling it to more or less freely receive the aforesaid vertical pivot pin 17 which connects the tow bar tongue 14 and the tow bar proper 16. Accordingly, the front end of the chain may be effectively attached to the rear end of the towing vehicle 10 by the existing pivot pin of the tow bar assembly 12. At its rear end the chain 22 mounts a conventional securing hook 25 whose pointed bill is sized to enable it to enter the eye of any one of the chain links adjacent which it may be disposed. Accordingly, by virtue of the substantial length of the chain relative to that of the tow bar assembly 12 and the provision of the hook 25, the rear end of the chain may be attached to the towed vehicle 11 at a point both below and substantially to the rear of the point or points of attachment of the tow bar assembly 12 to said towed vehicle. For example, the rear end of the chain may be secured to either the front cross part of the frame of the towed vehicle or to the front axle thereof by wrapping the rear end portion of the chain one or two times around said vehicle parts and then securing it by hooking the hook 25 to an adjacent chain link.

According to the invention, the stabilizer chain 22 incorporates in its length and in series relation a specially constructed shock unit generally designated 28 and a turnbuckle unit generally designated 30, the latter serving to tension said stabilizer chain following its attachment as aforesaid. By reference to FIG. 4, it will be seen that the aforesaid special shock unit 28 preferably comprises an elongated cylindrical sleeve member 31 disposed with its axis extending in the direction of chain length and having its end edges turned under so as to form internal end shoulders 32a, 32b which extend into the sleeve bore. Contained within the sleeve is a similarly elongated and generally cylindrical plug or bushing 33 of rubber or equivalent "springy" material having length and diameter such that it substantially fills the internal bore of the sleeve. Extending axially through the bushing 33 is the shank of rearward eye-bolt 34 whose eye end 34a projects through the rearward or hook end of the sleeve 31 and whose other (forward) end, which is contained within the sleeve 31, mounts a steel washer 35a engaging tight against the corresponding forward end of the rubber bushing 33. A similar but freely mounted steel washer 35b is interposed between the other (rearward) end of said rubber bushing and the corresponding end shoulder 32a of said sleeve.

Extending into the other or forward end of the sleeve 31 is a relatively short-length eye-bolt 36 whose eye end 36a projects through the forward end of the sleeve and is connected to the attaching-link end of the chain. At its sleeve-enclosed end the eye bolt 36 mounts a steel washer 35c which is normally in engagement with the corresponding end shoulder 32b of the sleeve.

Preferably, the bore provided in the rubber bushing 33 for the shank of the eye bolt 34 is slightly oversize with respect to the diameter of said shank. Moveover, rather than the bushing having a uniformly cylindrical outer surface, it is a feature of the invention that its said outer surface is formed with a plurality of axially spaced circular serrations or ribs 33a of diameter corresponding substantially to the internal diameter of the sleeve 31, said serrations or ribs being separated by lesser-diameter "valleys" or grooves 33b which define a plurality of axially spaced, annular air chambers 37 intermediate the inner surface of the sleeve 31 and the outer periphery of the body of the rubber bushing 33.

The specially constructed shock unit 28 employing a rubber spring as just described was designed and in practice has been found to overcome the difficulties present in the metallic coil spring-type shock unit as was heretofore employed in a tow-bar stabilizer of the invention. For example, a shock unit employing a coil spring having the size and requisite spring characteristics enabling it to withstand normal chain tensioning, plus the shock loads encountered in a tow bar stabilizer as herein proposed, would be far too large and bulky to be practical; and if made to practical size it would collapse to form a rigid link well before the maximum chain tension required during towing operations was applied thereto, whereupon either the spring or one of the chain links would break, or the threads of the turnbuckle unit 30 (to be described in detail) would be stripped upon the occurrence of the shock load which it was supposed to resist being applied to the chain. Another disadvantage of the coil spring type shock unit is that the coil spring employed therewith failed to stand up under the severe and frequently applied stresses to which it is subjected in towing. It was also found that since a coil spring does not grip the shank of the eye bolt 34 extending thereto when compressed by proper manipulation of the turnbuckle 30, it could sometimes happen that said eye bolt would spin with the turnbuckle nut, thus interfering with the intended chain-tensioning function of the turnbuckle.

These disadvantages of the earlier-used unsatisfactory shock unit are completely corrected by the special shock unit of the present application, consequent to the property and ability of the rubber bushing 33 built to a relatively small size to permanently retain its resilience under both normal and abnormal shock loads likely to be applied therein in a tow bar application. The aforesaid ability of the rubber bushing 33 to compress axially without ever forming in effect a solid link is substantially increased by the action of the serrations or ribs 33a provided on the external surface of the bushing, in conjunction with the intermediate valleys 33b, in forming a multiplicity of sealed annular air chambers which assist in pneumatically holding the rubber bushing against axial collapse and additionally add axial flexibility and cushioning effect to the shock unit as a whole. It is also to be observed that when it is axially compressed the rubber bushing 33 firmly grips to the shank of the eye bolt extending therethrough, thereby to prevent the eye bolt turning with the turnbuckle.

Illustratively, the aforementioned turnbuckle unit 28 comprises a nut member having an open cage end 38a and a tubular end 38b thereon, said cage end being provided with end walls 40a, 40b which are apertured and tapped with left-and-right hand threads, respectively. Threaded into said end-wall apertures are the oppositely disposed shanks of eye bolts 42, 43, the eye bolt 42 being connected to the section of chain extending between turnbuckle and rubber shock unit 28, and the eye bolt 43 being connected to the section of the chain extending toward its rear or hook end 25. It will be understood that the shanks of said eye bolts are cut with left- and right-hand screw threads, respectively, whereby rotation of the nut member in one direction draws the bolts 42, 43 together so as to tension the chain 22, and rotation of the nut in the opposite direction effects separation of the eye bolts and relief of said tension. The aforesaid tubular end 38b of the turnbuckle nut encloses and thereby protects the threads of the eye bolt 43 which, being disposed towards the rear end of the chain, is most likely to become fouled with roadway dirt and mud.

A tow bar stabilizer as aforesaid is intended for use with a tow bar assembly such as that indicated at 12, FIG. 2. The stabilizer may be attached at its front end simply by removing the cotter pin or other means which secures the pivot pin 17 of the tow bar assembly and passing said pin through the aperture 24 of the front-end chain link 23, thereupon replacing said cotter pin. To secure the rear end of the stabilizer, it is necessary only to wrap the rear end portion of the chain round the front cross part or front axle of the towed vehicle, thereupon securing said rear end by passing the bill of the hook 25 through the eye of a related chain link. In attaching the stabilizer chain, care will be taken to insure that it is disposed on the longitudinal center line of the tow connection between the towing and towed vehicles, as indicated in FIG. 2. When finally attached, the stabilizer chain slopes rearwardly downwardly as is indicated in FIG. 1, and it is placed under substantial tension by operation of the turnbuckle unit which serves to adjust the initial tension of the stabilizer.

One important function of the stabilizer as described is to apply a hold-down force on the rear end of the towing vehicle 10 in the event it tends to rise or buck consequent to a sudden application of the brakes by the driver. In explanation, such hold-down action stems from the fact that any lift of the rear end of the towing vehicle necessarily results in upward shift of the point of attachment of the stabilizer front end together with the pivot pin 17, as tends to cause elongation of the stabilizer chain 22, with such elongation of the chain being made possible only by a corresponding axial compression of the rubber bushing 33 of the special shock unit 28. By proper design of the latter, the magnitude of the hold-down force can be made commensurate with that necessary to overcome the lifting force tending to extend the chain. As a practical matter, however, the turnbuckle unit 30 is employed to initially tension the chain to a degree that its normal action is to supply the requisite hold-down force, with the shock unit 28 providing a safety valve, so to speak, in the event of too great tension being applied to the chain during the interval it exercises its hold-down action.

Over and above the capability of the herein tow bar stabilizer in applying a hold-down force on the rear wheels of the towing vehicle during a braking operation as aforesaid, it has been conclusively established in actual practice that the stabilizer of the invention may also be employed to increase the weight and thereby the traction of the rear wheels of the towing vehicle under any and all towing conditions as required for a particular towing job or road conditions requiring extra traction, as yields the desirable results of the towing vehicle having complete control of the towed vehicle, of the towed vehicle being easier to steer, and of substantially decreasing wear on the tires of the towing vehicle. More particularly, since tensioning of the chain 22, by simple manipulation of the turnbuckle 30, applies a downward force on the rear wheels of the towing vehicle, it follows that a corresponding upward force is applied to the front wheels of the towed vehicle; that is to say, with tightening of the turnbuckle 30, there results an automatic transfer of some of the weight of the towed vehicle to the rear wheels of the towing vehicle. Such is highly desirable when towing over wet roads, snow, ice or mud, since more weight on the rear wheels of the towing vehicle means better traction and better control over the towed vehicle. Accordingly, the tow bar stabilizer of the invention provides a ready means enabling the operator of a tow train to increase or decrease weight on and hence traction of the towing vehicle, as required to meet the driving conditions of a particular towing job. By maintaining proper traction, the towing vehicle keeps complete control of the towed vehicle during blowouts, hitting road shoulders, running into curves at high speeds, emergency stops, slippery roads, etc.

Another advantage of taking weight off the front wheels of the towed vehicle is that said wheels become much easier to steer and thus the towed vehicle tends to follow the towing vehicle around sharp turns and over gravel and slippery roads as makes for greater safety and less chance of accident. Also, with easier steering and better following of the towed car, the possibility of the hitched vehicles "weaving" while in transit on the highway is materially lessened, since both vehicles of the train handle as a unit and with the towing vehicle in complete command.

Since, with use of the herein tow bar stabilizer, "weaving" is not likely, weight distribution is more favorable and steering control is exercised to a high degree, wear on the tires of the towing car is substantially reduced. Such follows from the fact that with increased weight effective thereon, slipping and skidding of the wheels of the towing vehicle on turns and spinning of the wheels on take-offs, as causes excessive tire wear, are substantially reduced if not completely avoided.

In addition to its many important functions as aforesaid, a tow-bar stabilizer according to the invention also binds and draws the towed vehicle to the towing vehicle with spring force, thus taking up any slack between the vehicle resulting from wear or lost motion in the tow bar and/or its connections to said vehicle. This makes for smooth starting, stopping and braking, as by taking up slack in the tow bar connection, the continual "snatching" of the bumpers by the tow-bar clamps when starting or stopping or during braking is avoided, as is the possibility of the tow bars being worked loose and coming undone. Also, being attached to the frame or axle of the towed vehicle rather than to the front bumper thereof, a stabilizer as proposed takes a substantial part of the towing load away from said bumper, thus preventing the bumper from being pulled or torn away from the bumper plate and providing a safety feature in case the bumper is made of light-weight material or, as is not uncommon with repossessed cars, has been repaired or insecurely fastened.

While the tow bar stabilizer shown in FIG. 3 is of the type which is manufactured and attached as a unit separate from the existing tow bar assemby with which it is to be used, it may, within the scope of the invention, be physically combined with the tow bar assembly to provide, for example, a tow kit which may be attached as desired, or it may even be permanently attached to the towing vehicle. Such a modification is shown in FIG. 6, wherein reference numeral 44 designates a tow bar tongue corresponding to the aforesaid tongue 14, to the under side of which is secured as by welding a fitting 45 providing for permanent attachment to said tongue of the front end of the stabilizer chain 22, such illustratively being the front end attaching eye 46 of the aforesaid spring shock unit 28. The tongue 44 may be permanently secured to the rear end or rear bumper of the towing vehicle or it may be attached thereto as by the aforesaid bracket member 13.

From the above, it will be appreciated that an automatic tow bar stabilizer as described achieves in simple and effective manner the objectives of the invention as explained in the foregoing. However, as many changes could be made in carrying out the above constructions without departing from the scope of the invention, it is intended that all matter contained in the above description or shown in the accompanying drawing shall be interpreted as illustrative and not in a limiting sense.

I claim:

1. Automotive-vehicle towing means comprising, in combination, a tow bar assembly adapted to be connected respectively to the rear bumper of a towing vehicle and the front bumper of a vehicle to be towed and providing a draft connection between said vehicles including a transversely extending draw beam mounting bumper-attaching brackets at its ends for releasably attaching same to said rear bumper and having a central, rearwardly extending tongue affixed thereto, a rigid draft bar pivotally connected to said tongue and extending rearwardly therefrom and divergent draft arms mounting bumper-attaching clamps at their spaced rearward ends and extending between and connecting the rearward end of the draft bar and the front bumper of the towed vehicle, and stabilizer means comprising a flexible chain extending between and interconnecting said towing and towed vehicles and being disposed in the vertical plane of said tongue and draft bar and below said tow bar assembly as a whole, the front end of the chain being connected to the tongue substantially at the point of pivotal connection of the draft bar therewith, the rear end of the chain being connected to the front end of the towed vehicle at a point which is disposed below and rearwardly of the point of connection of the tow bar assembly therewith, and an axially compressible rubber bushing-type shock unit and a chain tension-adjusting means connected in series into the chain along the length thereof, the construction and arrangement being such that said stabilizer means when tensioned by said chain-tension adjusting means is adapted to transfer a portion of the weight of the front end portion of the towed vehicle to the rear end portion of the towing vehicle thereby to engender a holddown force on said rear end which acts in opposition to the tendency of said rear end to lift when the towing vehicle is braked and which further increases the traction of the towing vehicle in accordance with driving and/or road conditions.

2. Automotive-vehicle towing means substantially as set forth in claim 1, wherein said shock unit comprises an elongated bushing of rubber-like material whose ends are connected to the chain in such manner that said bushing is compressible responsively and proportionally to the chain being tensioned and is further compressible by shock loads to which the chain may be subjected.

3. Automotive-vehicle towing means substantially as set forth in claim 1 wherein said shock unit comprises an elongated cylindrical sleeve member, an elongated, generally cylindrical bushing of rubber-like material enclosed and substantially filling said sleeve member, and eye-bolt connections between the ends of said bushing and the opposite ends of the chain for effecting axial compression of the bushing responsively and proportionally to the chain being tensioned and further compression of the bushing in accordance with shock loads to which the chain may be subjected.

4. Automotive-vehicle towing means substantially as set forth in claim 3, wherein the peripheral surface of the bushing is comprised by circular ribs and intermediate grooves, said ribs being adapted to be expanded into tight engagement with the inner surface of the sleeve when the bushing is compressed, whereby the grooves form sealed air chambers.

5. Automotive-vehicle towing means substantially as set forth in claim 1, wherein said shock unit comprises an elongated cylindrical sleeve member, an elongated, generally cylindrical bushing of rubber-like material enclosed in and substantially filling the interior of said sleeve member, a connection between the forward end of the chain and the corresponding forward end of the sleeve member, an eye-bolt connection extending through the bushing and connecting the shock unit as a whole to the rearward end of the chain in such manner that tensioning of the chain effects axial compression of the bushing within the sleeve member, the peripheral surface of the bushing being defined by circular ribs and intermediate grooves, said ribs expanding to tightly engage the inner surface of the sleeve member when the bushing is subjected to axial compression whereby the grooves form sealed annular air chambers which resist axial deformation of the bushing.

6. Automotive-vehicle towing means substantially as set forth in claim 1, wherein the chain tension-adjusting means comprises a turnbuckle unit connected in the chain intermediate the shock unit and the rear end thereof.

7. Automotive-vehicle towing means substantially as set forth in claim 1, wherein said chain is provided at its forward end with a flattened and apertured attaching eye, and at its rearward end with a securing hook.

References Cited in the file of this patent

UNITED STATES PATENTS

| | | |
|---|---|---|
| 1,263,622 | Sulton | Apr. 23, 1918 |
| 1,445,754 | Carey | Feb. 20, 1923 |
| 1,734,072 | Blalack | Nov. 5, 1929 |
| 1,985,468 | Strang | Dec. 25, 1934 |
| 2,493,874 | Hume | Jan. 10, 1950 |
| 2,546,206 | Arehart | Mar. 27, 1951 |
| 2,549,814 | Hume | Apr. 24, 1951 |
| 2,616,716 | Annis | Aug. 26, 1952 |
| 2,639,141 | Gabriel | May 19, 1953 |
| 2,650,101 | Frankfother | Aug. 25, 1953 |
| 2,665,902 | Allen | Jan. 12, 1954 |
| 2,679,404 | Thompson | May 25, 1954 |
| 2,709,604 | Hartman | May 31, 1955 |
| 2,729,467 | Reese | Jan. 3, 1956 |
| 2,747,890 | Gerhardt | May 29, 1956 |

FOREIGN PATENTS

| | | |
|---|---|---|
| 541,887 | Germany | Jan. 18, 1933 |
| 564,374 | Germany | Nov. 18, 1932 |
| 833,759 | Germany | Dec. 7, 1953 |